United States Patent
Bergman

(10) Patent No.: US 10,560,043 B2
(45) Date of Patent: Feb. 11, 2020

(54) FLOATING DEVICE GENERATOR

(71) Applicant: Bruno Bergman, New Albany, OH (US)

(72) Inventor: Bruno Bergman, New Albany, OH (US)

( * ) Notice: Subject to any disclaimer, the term of this patent is extended or adjusted under 35 U.S.C. 154(b) by 614 days.

(21) Appl. No.: 14/742,221

(22) Filed: Jun. 17, 2015

(65) Prior Publication Data

US 2016/0141987 A1    May 19, 2016

Related U.S. Application Data

(63) Continuation of application No. 14/540,769, filed on Nov. 13, 2014.

(51) Int. Cl.
| | |
|---|---|
| *F03B 13/00* | (2006.01) |
| *F03B 13/10* | (2006.01) |
| *H02P 9/06* | (2006.01) |
| *F03B 15/08* | (2006.01) |
| *F03B 17/06* | (2006.01) |

(52) U.S. Cl.
CPC ................ *H02P 9/06* (2013.01); *F03B 13/00* (2013.01); *F03B 15/08* (2013.01); *F03B 17/063* (2013.01); *F05B 2240/932* (2013.01); *F05B 2250/712* (2013.01); *F05B 2260/5032* (2013.01); *F05B 2260/74* (2013.01); *F05B 2260/76* (2013.01); *F05B 2260/79* (2013.01); *F05B 2270/101* (2013.01); *F05B 2270/1016* (2013.01); *F05B 2270/20* (2013.01); *F05B 2270/327* (2013.01); *Y02E 10/226* (2013.01); *Y02E 10/28* (2013.01)

(58) Field of Classification Search
CPC .. H02P 9/06; F03B 13/00; F03B 15/08; F03B 17/063
USPC ......................................... 290/42, 43, 53, 54
See application file for complete search history.

(56) References Cited

U.S. PATENT DOCUMENTS

| | | |
|---|---|---|
| 1,280,617 A | 10/1918 | Watkins |
| 3,807,890 A | 4/1974 | Wright |
| 4,268,757 A | 5/1981 | Rogers |
| 4,352,990 A | 10/1982 | Ancoin, Jr. |
| 4,516,033 A | 5/1985 | Olson |
| 4,598,210 A | 7/1986 | Biscomb |
| 4,717,832 A | 1/1988 | Harris |
| 4,725,195 A | 2/1988 | Wiggs |
| 4,746,807 A * | 5/1988 | Furo .................... H02P 9/04 290/40 C |
| 4,843,249 A | 6/1989 | Bussiere |
| 5,451,137 A | 9/1995 | Gorlov |
| 5,471,098 A | 11/1995 | Asay |
| 6,551,053 B1 | 4/2003 | Schuetz |
| 6,935,832 B1 | 8/2005 | Platt et al. |
| 7,063,579 B2 | 6/2006 | Voves |
| 7,223,137 B1 * | 5/2007 | Sosnowski ................ 440/3 |
| 7,465,147 B2 | 12/2008 | Platt et al. |

(Continued)

FOREIGN PATENT DOCUMENTS

| | | |
|---|---|---|
| CN | 203463218 U | 3/2014 |
| DE | 102009029920 A1 | 12/2010 |
| WO | 2011/109858 A1 | 9/2011 |

*Primary Examiner* — Tulsidas C Patel
*Assistant Examiner* — Thomas Quigley
(74) *Attorney, Agent, or Firm* — Vorys, Sater, Seymour and Pease LLP; William L. Klima

(57) ABSTRACT

A floating power generator having a water wheel and electrical generator. The floating power generator can comprise a variable speed drive.

27 Claims, 10 Drawing Sheets

(56) References Cited

U.S. PATENT DOCUMENTS

| | | |
|---|---|---|
| 7,602,076 B1 | 10/2009 | Sipp |
| 7,696,633 B2 | 4/2010 | Zajchowski |
| 7,969,034 B2 | 6/2011 | Winius |
| 8,129,855 B1 | 3/2012 | Tong et al. |
| 2003/0146628 A1* | 8/2003 | Sanchez Gomez ............. 290/54 |
| 2008/0290663 A1* | 11/2008 | Shifrin ............................ 290/52 |
| 2009/0322091 A1* | 12/2009 | Jack ................................ 290/53 |
| 2010/0084870 A1 | 4/2010 | Burcik |
| 2012/0244760 A1 | 9/2012 | Ekhoff |
| 2014/0062091 A1 | 3/2014 | Soong |

* cited by examiner

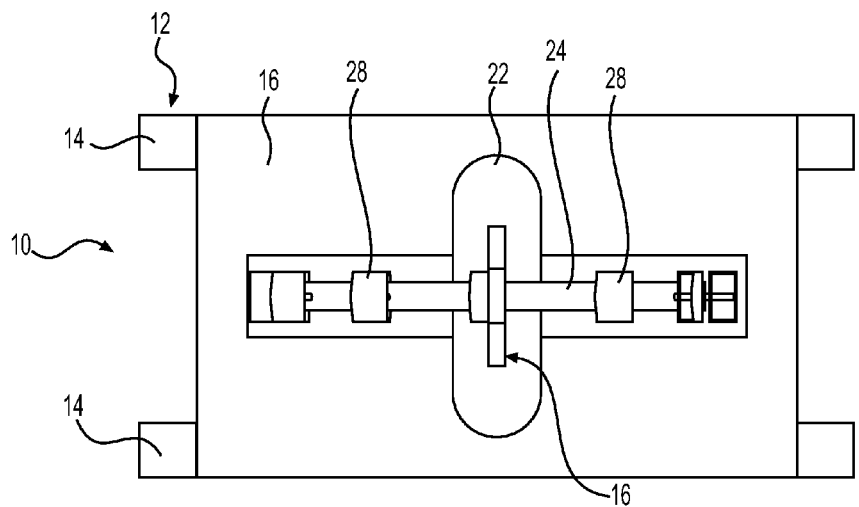
FIG. 4
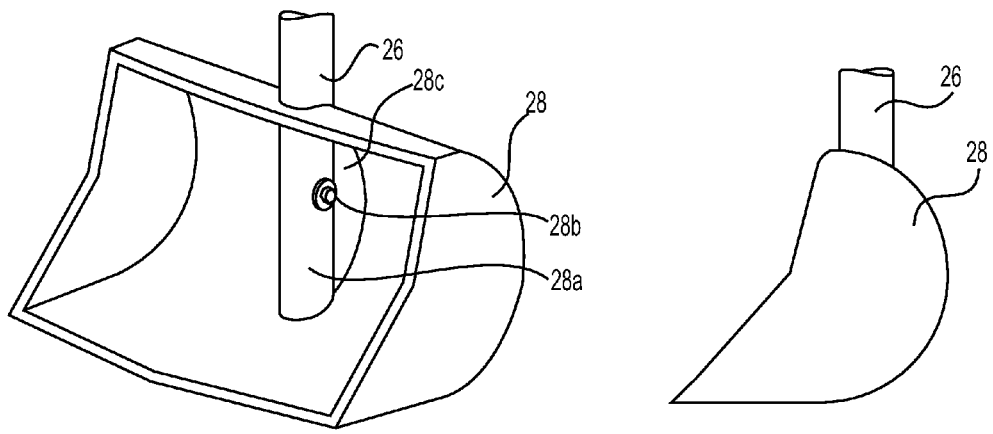
FIG. 5  FIG. 6

FLOATING DEVICE GENERATOR

This is a continuation application of non-provisional application Ser. No. 14/540,769, filed on Nov. 13, 2014. This continuation application claims priority to this non-provisional application under 35 U.S.C. §119(e)

FIELD

A floating power generator for generating electrical power. The floating power generator can be installed on a body of flowing water such as a river, channel, or stream to produce the electrical power.

BACKGROUND

There continues to exist a need for generating electrical power inexpensively without creating pollution. The flow of water in rivers, channels, and streams provides a very large source of green energy that can be converted into electrical power.

SUMMARY

The presently described subject matter is directed to an improved power generator.

The presently described subject matter is directed to an improved power generator comprising or consisting of a water wheel.

The presently described subject matter is directed to an improved power generator comprising or consisting of a water wheel connected to one or more electrical generators.

The presently described subject matter is directed to an improved power generator comprising or consisting of a water wheel, an electrical generator, and a variable speed drive connecting the water wheel and the electrical generator.

The presently described subject matter is directed to an improved power generator comprising or consisting of a water wheel, an electrical generator, and an electrical variable speed drive connecting the water wheel and the electrical generator.

The presently described subject matter is directed to an improved power generator comprising or consisting of a water wheel, an electrical generator, and a mechanical variable speed drive connecting the water wheel and the electrical generator.

The presently described subject matter is directed to an improved power generator comprising or consisting of a variable configuration water wheel, and one or more electrical generators.

The presently described subject matter is directed to an improved power generator comprising or consisting of a variable configuration water wheel having variable pitch paddles, and one or more electrical generators.

The presently described subject matter is directed to an improved power generator comprising or consisting of a water wheel, one or more electrical generators, and a lifting device for raising and lowering the water wheel.

The presently described subject matter is directed to an improved power generator comprising or consisting of a variable configuration water wheel, one or more electrical generators, and a lifting device for raising and lowering the water wheel.

The presently described subject matter is directed to an improved power generator comprising or consisting of a variable configuration water wheel having variable pitch paddles, one or more electrical generators, and a lifting device for raising and lowering the water wheel.

The presently described subject matter is directed to an improved power generator comprising or consisting of a variable configuration water wheel, one or more electrical generators, a variable speed drive connecting the water wheel and one or more electrical generators, and a lifting device for raising and lowering the water wheel.

The presently described subject matter is directed to a floating power generator for generating electrical power.

The floating power generator can be floated on a body of water (e.g. river, channel stream), and towed or powered to a particular location and orientation. Then, the floating power generator can be secured in place using a chain or cable. For example, the floating power generator is secured using one or more anchors, moorings, and/or ground posts. Alternatively, the floating power generator can be secured to a dock.

The floating power generator, for example, can comprise a catamaran having a pair of spaced apart hulls. For example, a plurality of cross beams connect the hulls together. In addition, a platform can be provided on top of the cross beams. A frame is connected to the cross beams and platform, and a water wheel is supported by the frame.

The floating power generator can include transverse oriented spoon shaped paddles rotating through a center line of the catamaran and generating electricity. The boat or vessel can be firmly anchored in the river, for example, with steel cables and concrete anchor. The power that is generated by the floating power generator is transferred through electrical cables attached to steel anchor cables extending to a transformer unit on the shore that is connected to an electric grid.

The floating power generator uses the raw power of the river flow or tide water movement. A 7 knot water flow contains the same energy as 150 miles/hr wind. Further, water flow is typically constant capitalizing on the never ending natural cycle of sun activity, water evaporation, and precipitation. The floating power generator can be easily removed, or moved along with the anchoring system, and an on-shore transformer system can also be mobile (e.g. wheel based).

The floating power generator can include a variable speed drive (e.g. transmission or gearbox having a gearshift mechanism) to maximize the generator rotations based on the speed of the flow of the river and the amount of force generated. If the flow slows down, the unit can down shift to maintain a targeted or selected electrical generator rotational speed.

The floating power generator is environmentally friendly, completely non-invasive process of capturing energy from water flow, and without the need to dam the river or artificially control the shape or flow of the river. By being based on a floating unit, it fluctuates with the river level, or naturally self rotates and aligns with incoming or outgoing tides.

Depending on the river depth, speed and available power, the floating power generator is easily scalable. For example, the unit can be a giant unit mounted on two (2) barges, that can feature several paddle wheels in one unit, or can be a small, almost camping size unit, that can be assembled on the spot and used as temporary source of power.

The average unit, for example, can be 40-50 feet long, which will require depth of the river for smooth rotation of around 3-4 feet. Smaller units can operate in as little as one foot of water, while the large barge based unit can operate and harvest energy from the world's deepest and largest rivers with paddles that require 5-6 feet minimum depth.

Since the rivers are never ending source of the flow of the water, the energy production is not interrupted unlike wind mills or wind farms that do not operate when there is no wind. Also, these units can be daisy chained to each other, for example, hundreds of feet apart, and floated along an entire river system. Since the power of the river flow is generated by gravity pulling water down the water flow, the down scream daisy chained units can all be operated at the same power output. By using the anchoring system along the way, the daisy chain can be curved to stay in the main water flow and follow the river shape and generating electrical power without disturbing the environment.

Since the units can be fitted and lit with navigational lights, on larger rivers the units can provide better lighting for navigation at night. In areas where there is significant tidal activity, the units can be provided with 360 degree circular space around to rotate relative to incoming or outgoing tide.

In the climates where rivers freeze in the winter, the units can be pulled out, like a boat to dry dock same to pass through the winter.

The maintenance can be relatively simple and inexpensive. From maintaining the power generator to removing the growth on the underside of the boats or vessels. The units should be pulled out periodically, for example, every two (2) years to get a coat of anti-fouling paint applied.

The basic idea reverses the traditional power plant situated on a dam. The purpose of the dam is to provide a steady flow of the water and a head to a turbine generator that is fixed. The units avoids the need for billion dollar dam construction projects that are not environmentally friendly.

The manufacturing cost of the units is comparatively low compared to almost any other electricity generating unit, which makes it an ideal low cost power plant for developing nations, where over 70% of the population lives close to a river.

With these units, most of the developing world can be electrified, and with it comes enormously increased living standards, air conditioning, internet, and water purification systems.

The paddles of the water wheel are turned by the relative flow of water impinging on the paddles. This arrangement produces torque by transferring the kinetic energy of the flowing water to the paddle cups of the paddles to rotate the water wheel.

If the paddles move the same speed as the water, the paddle cups are not fully capturing the kinetic energy of the water flow.

If the paddle wheel is slowed down, through employing resistance of the paddles and paddle cups in the flowing water then more kinetic energy of the water flow can be captures. For example, using a variable speed drive (e.g. gear box) to make rotating the generator more difficult to rotate, then more of the kinetic energy can be captured. If too much resistance is applied, then the water wheel will stall and produce no power.

Therefore, a computer receiving input from an accurate rotation speed sensor applied to the water wheel can generate an output to control the operation of the water wheel. For example, the computer can calculate the speed of the paddle cups verses speed of the flowing water using the diameter and shaft rotations of the water wheel. The speed of the flowing water can be accurately measured. It is speed of the flowing water relative to the stationary that is measured.

Once these measurements are made, the computer needs to apply, for example, a gearbox reduction ratio to make the paddle cups of the paddles move about 20-30% slower than water. In this manner, then most of the kinetic energy of the flowing water is captured compared with capturing the energy of the natural flow.

The kinetic energy converted by the water wheel and transferred through electronically controlled gear box can be maximized by continuously adjusting for the speed of the water to maximize power generation by the electrical generator(s).

For example, a 3 knot water flow, with the gearshift applying reverse generator torque against the rotation of the water wheel will capture 20-30% more energy, resulting in energy equivalent to a water flow of 3.5 knots. This would be equivalent to the energy of wind speed of 75 miles an hour applied to windmill. Most wind mills shut down at 25 mph. A single unit operating like this would create electric power equivalent to many windmill plants.

The floating power generator can optionally be provided with foldable paddles, so the paddles can be folded to assist in moving the unit to a particular position. In addition, the floating power generator can be provide with a brake to stop the unit, for example, in case of emergency.

Again, slowing the movement of the paddle cups of the paddles relative to the speed of the water (e.g. 20-30% slower) can increase the amount of kinetic energy transferred from the water flow to the water wheel. The particular number of paddles and paddle designs can be optimized to obtain maximum efficiency. The operation of the water is controlled by computer to maintain maximum transfer of kinetic energy (i.e. operational sweet spot) from the flowing water to the water wheel by controlling the variable speed drive (e.g. electric variable speed drive, electronic speed controlled gear box or transmission). For example, if the water flow speeds up, then gears are changed in real time to create more resistance to the water flow. The variable speed drive can be operated in a linear manner or exponentially depending on the programming of the computer.

The floating power generator can include a failsafe in case the water flow speed measuring device fails. For example, the speed of the axle of the water wheel can be measured. The computer can be preprogram to keep the gears from slowing down too much. In other words, the computer operates the electronically controlled gear box or transmission to change the gears to almost a stall level, and then works backwardly to the sweet spot based purely on the speed of the axle of the water wheel. Further, the computer can be program to notify the operator of any needed repair or maintenance.

The rotational speed ratio of the electrical generator verses the axle of the water wheel can have a variable ratio. For example, this ratio can be 80:1 to 180:1. Further, it is estimated that an average unit can generate up to 5 mWh, and a super-sized one can generate up to 12 mWh.

The particular arrangement of the floating power generator can be based on Betz's law of efficiency. The water wheel is capable of low RPM while providing high torque. The hulls or barges of the vessel (e.g. catamaran) can measure 60-100 feet length at waterline. The water wheel can be 40-60 ft in diameter, drafting 3½ feet at barges and 5 feet at the paddle.

The average river speed can be around 2 miles per hour. There are a number of rivers that move much faster, but this is the average large river. For example, the Mississippi river at New Orleans can speed up to 3 mph. This speed can rotate the water wheel at 2-3 rpm.

The transmission or gearbox can be around a 90:1 rotational speed ratio for medium to low speed electrical generators. The transmission or gearbox can be designed for each particular river speed. The river speed typically varies very little throughout the year and each transmission or gearbox conversion can be custom sized for the maximum speed and torque. The river speed varies more between rivers than between seasons on the same river.

The electrical generators can weigh between 4- and 12 tons, and can generate between 5 kW and 12 kW.

The shape of the paddles can be more square to capture the corners. The paddles can be 15-18 feet in width, 5-6 feet high and would capture 6-8 cubic meters of water. In addition, the frame can be an A frame or an upside down T frame.

The second dimensions I noted are for the larger vessel of 100 feet.

The water wheel can comprise an inner hub and an outer ring. A plurality of spokes connect the inner hub and outer ring together. A plurality of paddles are each connected to an outer end of each spoke. For example, the outer ring is made of circular sections of square cross-sectional tubing welded or connected together. The inner hub is circular and fabricated from a section of tubing.

The outer ring and inner hub are provided with through holes fitted with sleeves to accommodate the outer and inner ends of the spokes for rotation. When the spokes are rotated, the pitch of the paddles is adjusted or changed. For example, the paddles are oriented transversely relative to the outer ring (i.e. parallel to rotary axis of water wheel). The spokes can be rotated clockwise or counter clockwise to change the pitch angle of the paddles. The amount of force applied to the paddles of the body of moving water decreases at the pitch angle is increase in magnitude in the positive or negative angle direction.

The hub comprises an outer hub and an inner hub. The inner hub accommodates an axle of the water wheel. An adjustable pitch unit is accommodated between the outer hub and inner hub for selectively rotating the spokes. For example, the adjustable pitch unit comprises a bevel gear cooperating with pinion gears connected to the inner ends of the spokes. As the bevel gear is rotated relative to the hub, the spokes are rotated to change or adjust the pitch angle of the paddles. In addition, the adjustable pitch unit comprises a worm gear connected to the bevel gear via the inner hub. A worm driven by a motor cooperates with the worm gear to simultaneously rotate the worm gear along with the bevel gear. The motor is configured to rotate with the adjustable pitch unit. For example, the motor is mounted to the bevel gear and/or inner hub. The motor is an electrical, hydraulic, or pneumatic motor. A connector is provided to operate the motor, and allow the motor to rotate relative to frame and platform of the floating power generator. For example, the connector is a slip ring connector. The motor is configured to be selectively operated and controlled by a computer and/or manual control unit.

The frame supporting the water wheel, for example, can be made of sections of box beams (e.g. square, rectangle, round cross-sectional tubing) fitted with connector plates. The sections of box beams can be assembled together, for example, by bolting and/or welding. For example, the frame can comprise a pair of posts connected together by one or more cross-members. The frame can include a pair of inwardly extending outriggers configured to accommodate the axle of the water wheel connected to a pair of electrical generators. For example, the axle of the water wheel is support on opposite ends by a pair of axle mounts connected to platforms provided on top of each inwardly extending outriggers. A pair of couplings can connect the axle of the water wheel to the electrical generators. The frame can include a pair of outwardly extending outriggers configured to accommodate one or more equipment boxes elevated above the platform of the floating power generator.

The frame can be mounted to the platform so as to be fixed, or can be configured to be adjustable in height. For example, a pair of hydraulic jacks can connect the frame to the platform of the floating power generator. The hydraulic jacks can each comprise a hydraulic jack and a sleeve housing for accommodating a lower end of each post of the frame. The hydraulic jacks can each include a solenoid locking device to cooperate with locking pawls provided on the lower end of each post of the frame configured to selectively lock and unlock the frame in position relative to the platform. The hydraulic jacks are configured to raise or lower the height of the water wheel relative to the water level of the body of flowing water. Increasing the depth of the paddles increases the amount of force applied to each paddle by the body of flowing water.

The floating electrical generator comprises an electrical system to operate same. For example, the electrical system can comprise a computer connected to a variety of sensor for receiving input signals and connected to a variety of controls/devices for operating the floating electrical generator.

For example, the floating electrical generator can comprise a flow sensor for detecting the flow speed of the body of flow water relative to the floating electrical generator. Further, the water wheel can be fitted with a sensor for detecting the rotational speed of the water wheel. In addition, one or more of the spokes (e.g. all spokes) can be fitted with a pitch sensor to detect the angle of the paddle or paddles relative to the axle of the water wheel. Also, the platform can be fitted with a sensor for detecting the height of the water wheel relative to the platform, or otherwise the depth of the paddles relative to the water level of the flowing body of water.

Based on the input from these sensors, the computer can generate output signals for controlling a brake unit for braking the water wheel. For example, the adjustable pitch unit can be provided with a disk brake arrangement for braking the water wheel. Alternatively, the brake unit can be applied between the outer ring of the water wheel and platform (e.g. rubber vehicle type tire/wheel riding on a side surface of the outer ring).

The floating electrical generator can comprise a variable speed drive connected between the axle of the water wheel and the one or more electrical generators. The variable speed drive can be an electrical variable speed drive configured to control the voltage and current through the windings of the stator and rotor of the one or more electrical generators. Alternatively, the variable speed drive can be a mechanical transmission connected between the axle of the water wheel and the one or more generators. As a further alternative, both an electrical variable speed drive and a mechanical variable speed drive can be used in combination.

A generator controller can connect the computer to the one or more electrical generators to control the operation of the floating power generator in real time, for example, to constantly maximize power output of the one or more electrical generators. The computer is programmed to receive the inputs from the sensor, and constantly adjust the outputs to control the one or more generator via the generator controller. The power output of the one or more electrical generators can be monitor with one or more power meters configured to provide a feedback signal to the computer.

DRAWINGS

FIG. 4 is a top planar view of the floating power generator shown in FIG. 1.

FIG. 5 is a perspective view of a paddle of a paddlewheel of the floating power generator shown in FIG. 1.

FIG. 6 is a side elevational view of the paddle shown in FIG. 5.

DETAILED DESCRIPTION

Figure 1:
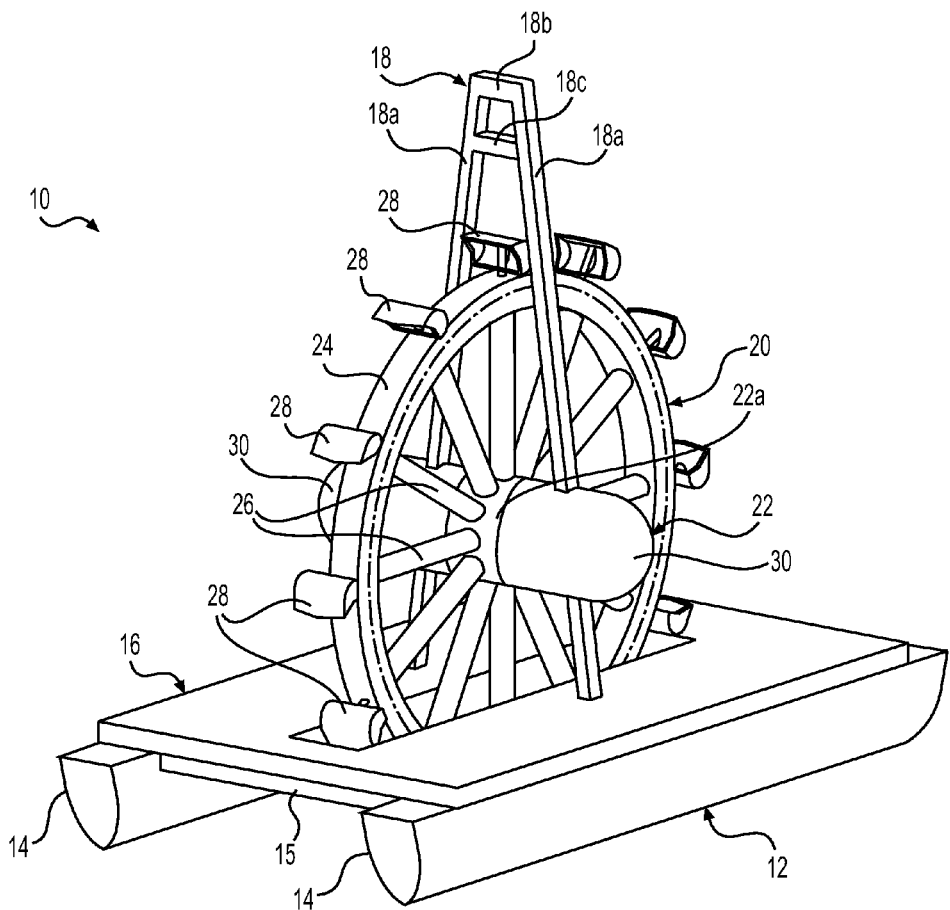
FIG. 1 is a perspective view of a floating power generator.
Figure 2:
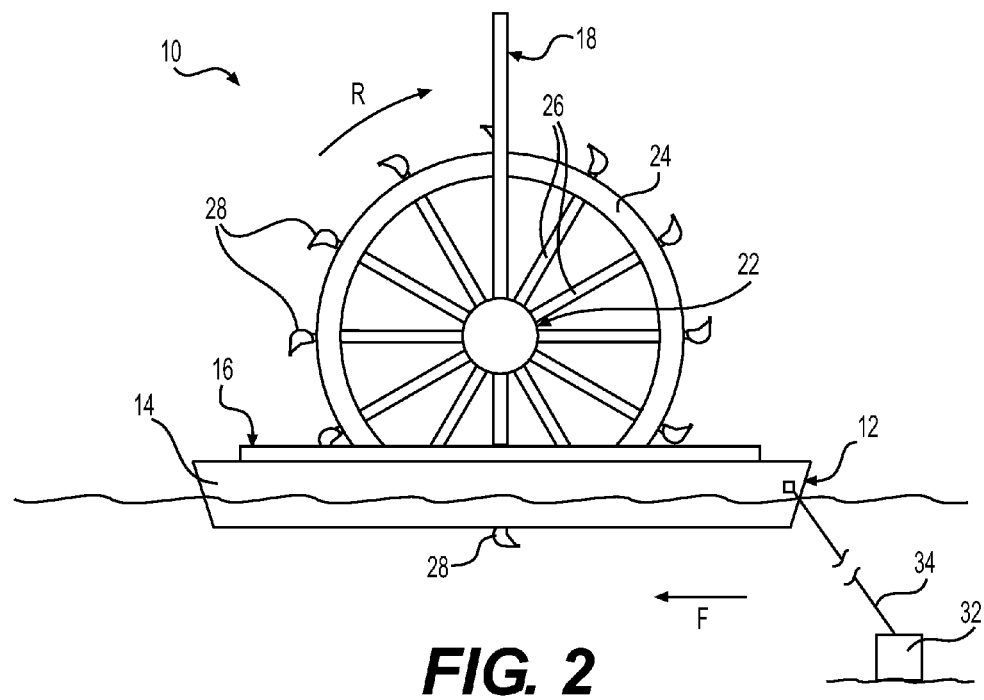
FIG. 2 is a side elevational view of the floating power generator shown in FIG. 1.
Figure 3:
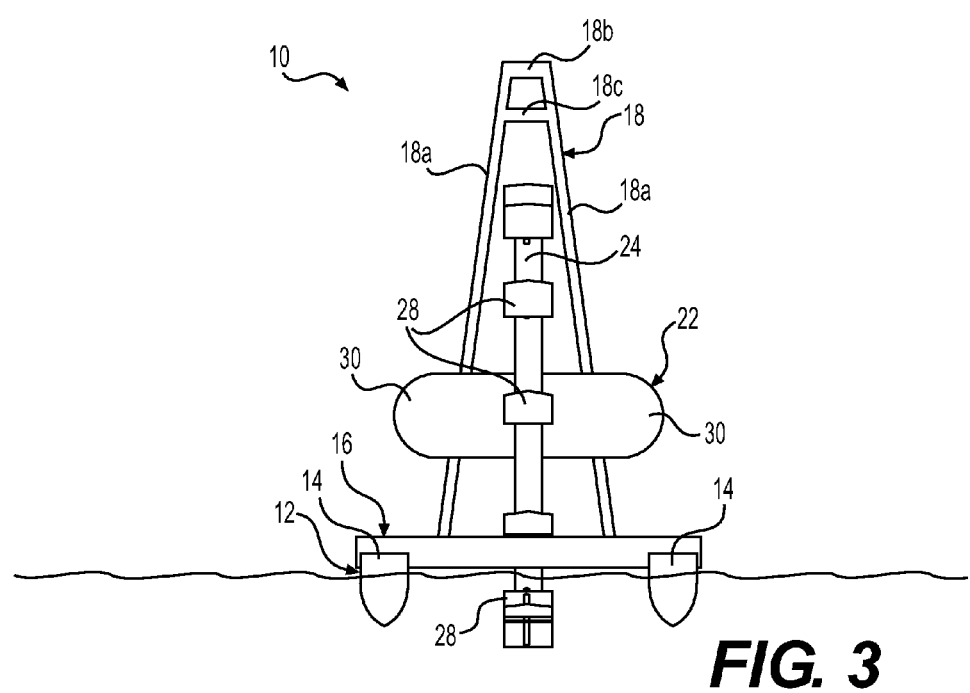
FIG. 3 is an end elevational view of the floating power generator shown in FIG. 1.

The floating electrical power generator 10 is shown in FIGS. 1 thru 4. The floating electrical power generator 10 comprises a catamaran 12 having a pair of spaced apart hulls 14 provided with a plurality of cross-beams 15 supporting a platform 16, and a frame 18 supporting a water wheel 20.

The water wheel 20 comprises a center hub 22 and an outer ring 24 positioned concentric relative to the hub 22. The hub 22 and outer ring 24 are connected together by spokes 26 each having a paddle 28.

As shown in FIGS. 5 and 6, each paddle 28 is provided with a sleeve 28a, a fastener 28b (e.g. nut and bolt), and a sleeve reinforcement 28c (e.g. weld steel). An end of each spoke fits into each sleeve 28a of each paddle 28 to removably connect each paddle to each spoke.

Figure 8:
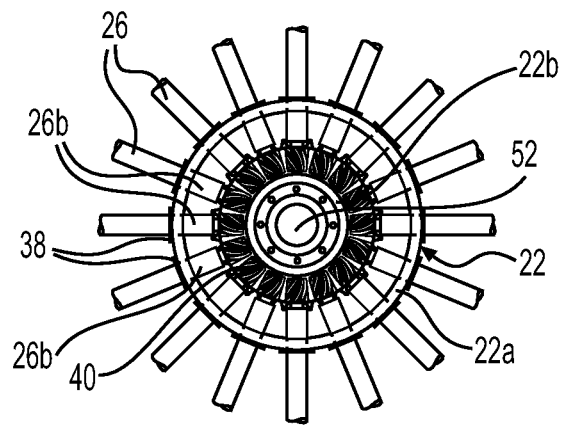
FIG. 8 is a broken away side elevational view of an interior of one side of a hub of the paddle wheel of the floating power generator shown in FIG. 1.
Figure 9:
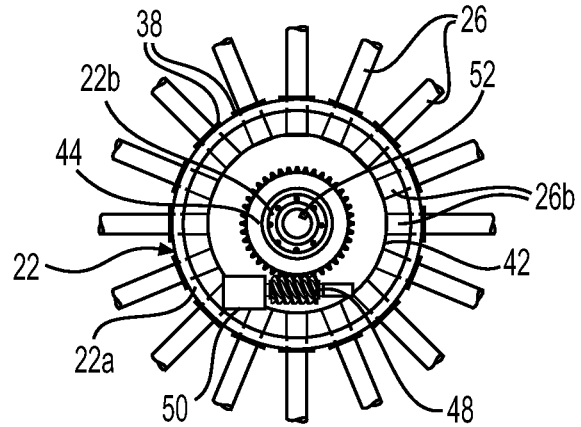
FIG. 9 is a broken away side elevational view of the interior of an opposite side of the hub shown in FIG. 8.

As shown in FIGS. 8 and 9, the hub 22 comprises an outer hub 22a, an inner hub 22b, and a pair of hub covers 30 provided on opposite sides of the outer hub 22a.

The floating electrical power generator 10 can be installed in a moving body of water (e.g. river, stream, run). For example, an anchor 32 (e.g. cement block, metal anchor) can be connected via an anchor line 34 to the floating electrical power generator 10 to maintain same at a fixed position on the moving body of water. Alternatively, a plurality of anchors and/or posts on land can be used to secure the floating electrical power generator 10 from movement on the moving body of water.

Variable Pitch

The paddles 28 can be fixed from rotation relative to the outer ring 28. For example, the paddles 28 can be fixed and orient perpendicular relative to the direction of water flow F (e.g. centerline of the catamaran 12 can be aligned with direction of water flow F). Alternatively, the paddles can be mounted to have a variable pitch relative to a centerline of each spoke 26 so that the angle of the paddles relative to the direction of water flow F can be varied from perpendicular to a selected off angle (e.g. positive or negative add).

The variable pitch configuration of the paddles 28 can change the amount of bite of the paddles 28 in the water flow F. For example, the paddles 28 can be configured so that maximum bite with the water occurs when the paddles 28 are orient perpendicular relative to the direction of water flow F. When, the pitch of the paddles 28 are changed positive or negative, the paddles 28 have less bite with the water, and the rotational speed of the water wheel 20 can be increased. It is noted that a positive and negative pitch of the paddles 28 can also produce a side thrust and/or torque applied to the catamaran 12, which can be used to maneuver the catamaran (e.g. catamaran maneuvered off angle relative to the direction of water flow F).

Figure 7:
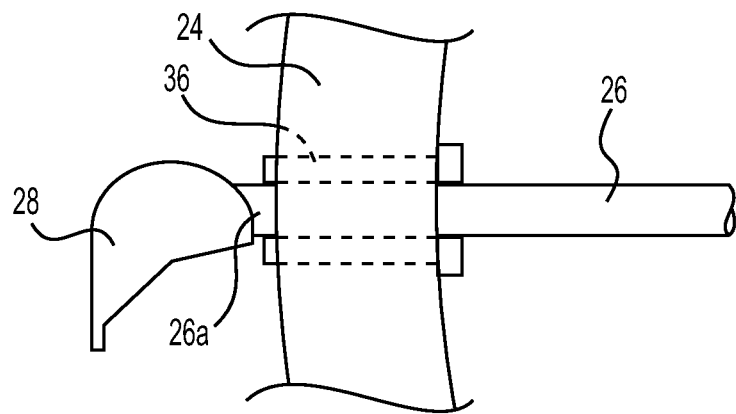
FIG. 7 is a broken away side elevational view of one (1) paddle and a portion of the paddle wheel of the floating power generator shown in FIG. 1.

A variable pitch arrangement of the paddles 28 is shown in FIG. 7 thru 12. Specifically, as shown in FIG. 7, each paddle 28 is mounted onto an outer end 26a of each spoke 26. The outer end 26a of each spoke 26 fits within a through hole in the outer ring 24, and is supported by the outer ring 24. The through holes in the outer ring 24 are each fitted with a sleeve 36 configured to allow the respective spoke 26 to rotate therein. For example, each spoke 26 and sleeve 36 have a cooperating round configuration (i.e. round cross-sectional shape). The round spoke 26 fits through the round sleeve 36 to provide a configuration to allow the round spoke 26 to be rotated within the round sleeve 36 when rotating each paddle 28. In this manner, the angle of the paddles 28 (e.g. leading edge of each paddle) can be adjusted or varied relative to the outer ring 24 and relative to the direction of water flow F.

As shown in FIG. 8, an inner end 26b of each spoke 26 fits within a through hole in the outer hub 22a, and is supported by the outer hub 22a. The through holes in the outer hub 22a are each fitted with a sleeve 38 configured to allow the respective spoke 26 to rotate therein. For example, each spoke 26 and sleeve 36 have a cooperating round configuration (i.e. round cross-sectional shape). The round spoke 26 fits through the round sleeve 36 to provide a configuration to allow the round spoke 26 to be rotated within the round sleeve 36.

Figure 10:
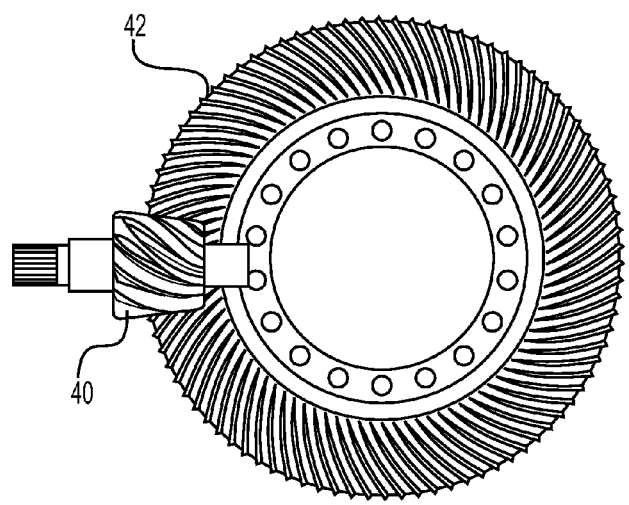
FIG. 10 is an enlarged side elevational view of a gear set provided on the one side of the hub shown in FIG. 8.

The inner end 26b of each spoke 26 is provided with a pinion gear 40 (FIG. 8) cooperating with a bevel gear 42. For illustration purposes, a single pinion gear 40 cooperating with the bevel gear 42 is shown in FIG. 10; however, the pinion gears 40 of all the spokes 26 cooperate with the bevel gear 42, as shown in FIG. 8. As the bevel gear 42 is rotated, the pinion gears 40 are simultaneously rotated to change the pitch of the spokes 26 and corresponding paddles 28.

Figure 12:
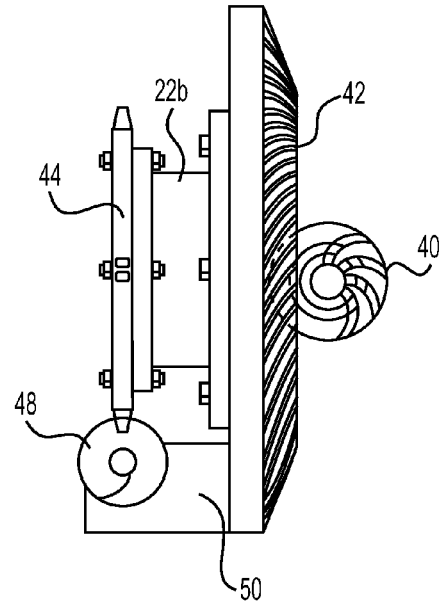
FIG. 12 is a side elevational view of the combined gear set assembly shown in FIGS. 10 and 11.

The bevel gear 42 is connected to a worm gear 44 via an inner hub 22b, as shown in FIG. 12. A worm 46 cooperates with the worm gear 44 to simultaneously rotate the worm gear 44 and bevel gear 42 to rotate the pinion gears 40 and spokes 26 to change the pitch of the paddles 28.

As shown in FIG. 9, a motor 48 (e.g. electric, hydraulic) is connected to the worm 46 to selectively and simultaneously drive the worm gear 44, inner hub 22b, bevel gear 42, and pinion gears 40 to rotate the spokes 26 and change the pitch of the paddles 28 when activated.

Figure 11:
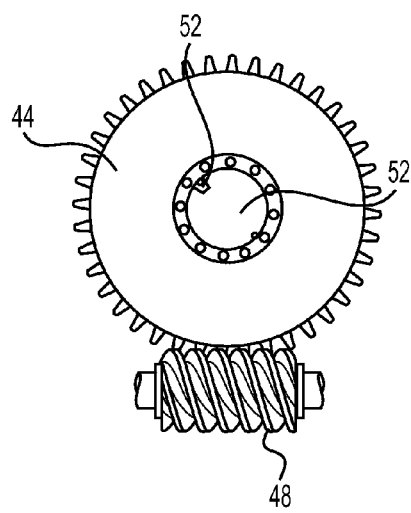
FIG. 11 is an enlarged side elevational view of another gear set provided on the opposite side of the hub shown in FIG. 9.

The inner hub 22b is mounted on an axle 50 of the water wheel 20. For example, a through hole in the inner hub 22b and the axle 50 are keyed together with a key 52, as shown in FIG. 11, so that the axle 50 and inner hub 22b rotate together with the water wheel 20. Further, the motor 48 is mounted to rotate along with the inner hub 22b. For example, as shown in FIG. 12, the motor 48 is mounted to a backside of the bevel gear 42 to spin or rotate together as a unit with the inner hub 22b, outer hub 22a, and outer ring 24 of the water wheel 20 as an assembled unit.

The motor 48 can be an electric, hydraulic, or pneumatic motor configured to be remotely controlled via wire or wirelessly. The motor 48 is configured to be supplied with electrical power, hydraulic fluid, or air pressure while rotating around with the water wheel 20. Thus, an electric, hydraulic, or pneumatic connection configured to allow rotation between motor 48 and a stationary input or supply of electric, pressurized hydraulic fluid, or pressurized air will be required as a component of the motor 48, or a separate unit mounted in proximity relative to the motor 48. For example, a slip ring electrical conductor can provide electric power to the motor 48.

Frame

Figure 13:
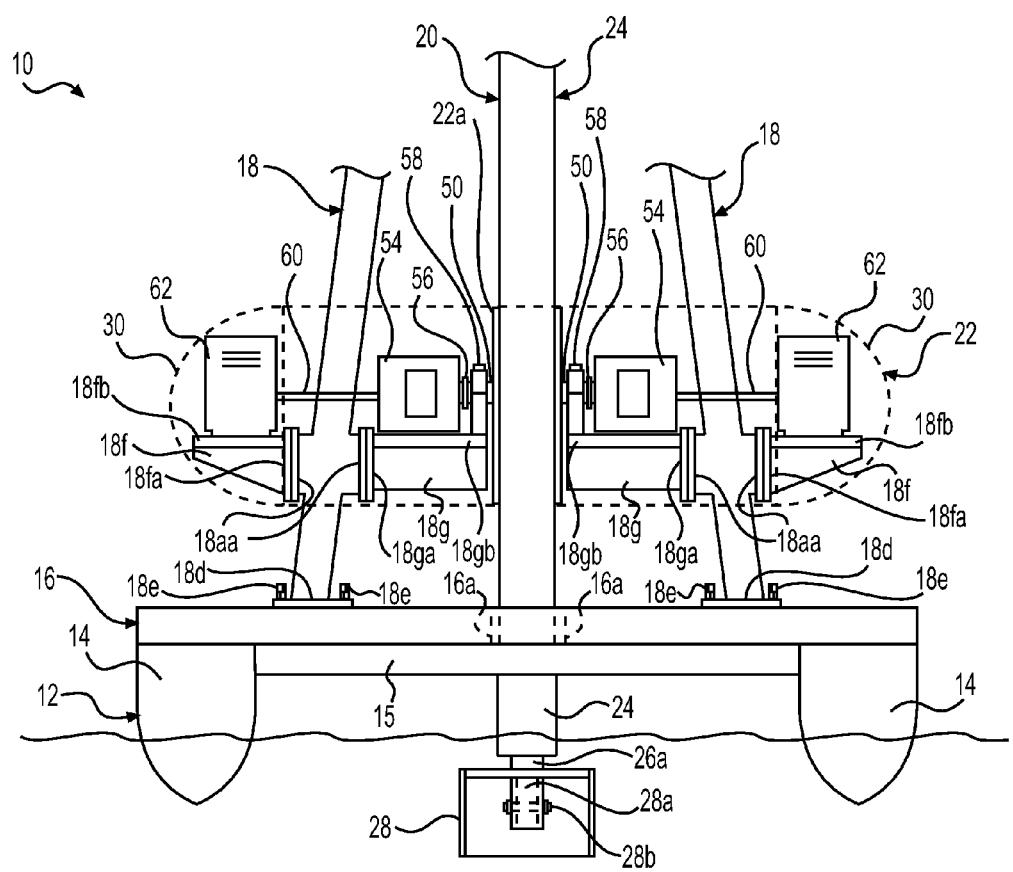
FIG. 13 is a partial end elevational view of the floating power generator shown in FIG. 1.

The frame 18 comprises a pair of spaced apart inclined posts 18a connected together at the top thereof by cross-members 18b and 18c and connected together at the bottom thereof by a plurality of cross-members 15 of the catamaran 12 and the platform 16, as shown in FIG. 13. For example, the frame 18 can be a metal frame made of rectangular cross-sectional tubular members welded and/or fastened together.

The posts 18a can be provided with anchoring plates 18d and bolt fasteners 18e for removably and securely connecting the frame 18 to the cross-members 15 of the catamaran 12 and platform 16.

The posts 18a can be fitted with outwardly extending outriggers 18f and inwardly extending outriggers 18g. For example, sections of metal box beams are fitted with anchoring plates 18fa, 18ga and mounting plates 18fb, 18gb, respectively. The anchoring plates 18fa, 18ga connected to mounting plates 18aa of the posts 18. The respective anchoring plates can be connected together (e.g. using nuts and bolts).

The platform 16 can be constructed, for example, with a flat slip proof upper surface, and a slot 16a (FIG. 13) for accommodating the water wheel 20 extending through a center portion of the platform 16.

Further, for example, the frame 18 can be made of a type of steel that is corrosion resistant (e.g. stainless steel, aluminum) and/or creates a protective outer layer when weathered. Alternatively, the frame 18 can be made of metal and coated inside and outside (e.g. electroplated, galvanized, primed, painted, tarred) to prevent corrosion thereof.

Electrical Generators

The floating power generator 10 comprises one or more electrical generators 54 (e.g. pair of generators 54) installed on the inwardly extending outriggers 18g. The electrical generators 54 are coupled to the axle 50 of the water wheel 20 by couplings 56. A pair of mounts 58 installed on the mounting plates 18gb of the inwardly extending outriggers 18g support opposite ends of the axle 50 of the water wheel 20 to allow rotation thereof.

The electrical generators 54 are connected via electrical cables 60 to the equipment boxes 62 installed on the mounting plates 18fb of the outwardly extending outriggers 18f. The equipment boxes 62 can contain electrical equipment to operate and control the floating power generator 10.

The electrical generators 54 can be configured to generate direct current (DC), or can be alternators configured to generate alternating current (AC).

Variable Speed Drive

Figure 14:
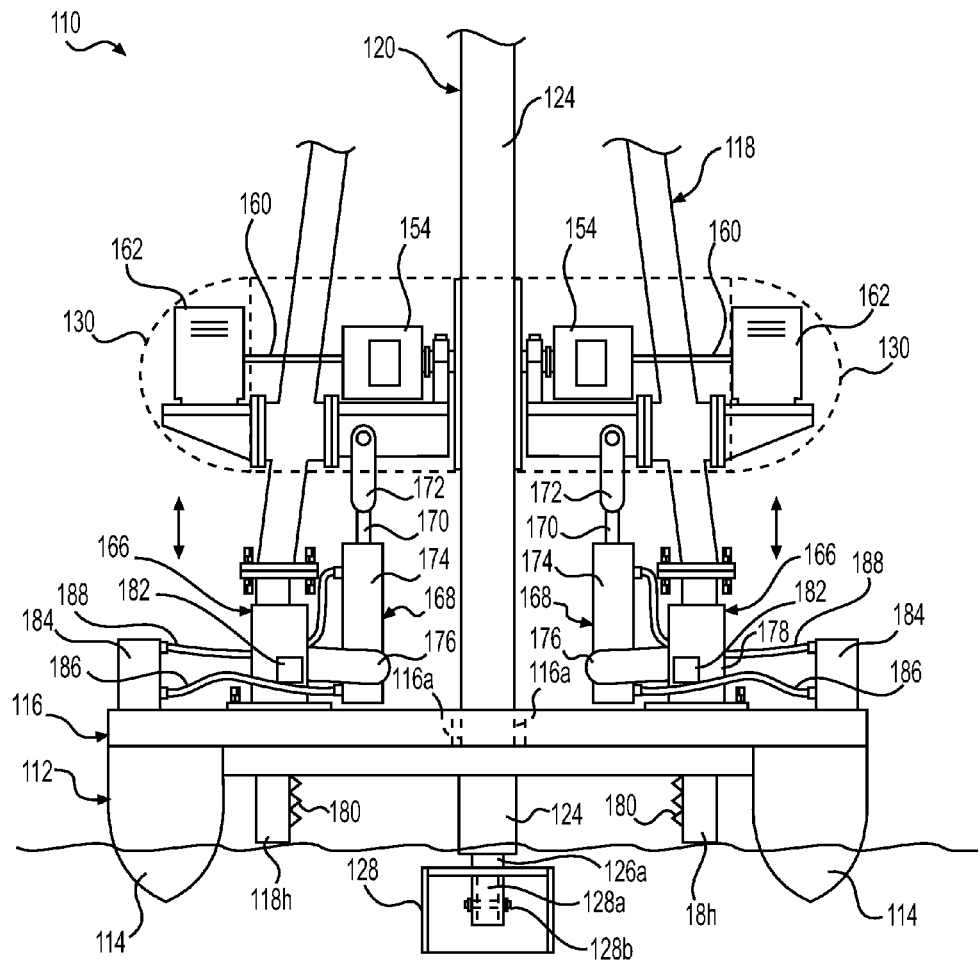
FIG. 14 is a partial end elevational view of another floating power generator.

As shown in FIG. 14, the electrical generator 54 can be directly connected to the water wheel 20 (e.g. via axle 50 of the water wheel 20 and coupling 56).

Figure 15:
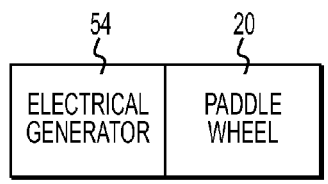
FIG. 15 is a diagrammatic view of the combined electrical generator and paddle wheel.
Figure 16:
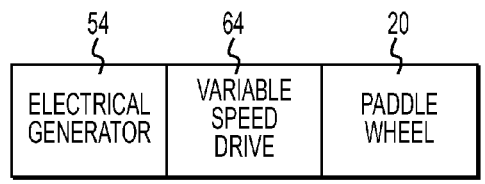
FIG. 16 is a diagrammatic view of the combined electrical generator, variable speed drive, and paddle wheel.

As shown in FIG. 15, the electrical generator 54 can be connected to the paddle wheel 20 via a variable speed drive 64. The variable speed drive 64 can be a mechanical variable speed drive (e.g. transmission), and/or can be an electrical variable speed drive controlling the operation of the electrical generator 54 based on the operation of the water wheel 20.

Variable Depth Paddles

The depth of the paddles relative to the water level WL can be configured to be variable or adjustable. For example, as shown in FIG. 14, the frame 118 can be raised and lowered by hydraulic jacks 166 each fitted with a hydraulic cylinder 168 for raising and lowering the water wheel 120 to correspondingly raise and lower the paddles 128 relative to the water level WL.

The hydraulic cylinders 168 each comprise a piston 170 provided with a yoke connector 172 and a cylinder 174 connected by a bracket 176 to a sleeve housing 178 of each hydraulic jack 166. The sleeve housings 178 each comprise an internal passageway extending top to bottom for slidingly accommodating a lower frame section 118h fitted with a locking pawl 180. The sleeve housings 178 are each fitted with a solenoid locking device 182 cooperating with the locking pawl 180 for selectively electronically locking and unlocking the frame 120 within the hydraulic jack 166 at a selected height. Specifically, the solenoid locking devices 182 are electronically unlocked (e.g. remotely by electronic control) to allow the frame 120 to be raises or lowered via the hydraulic cylinders 168. After the height of the frame 120 is adjusted to adjust the depth of the paddles 128 relative to the water level WL, the solenoid locking devices 182 are then actuated to locked the frame 120 at the adjusted height within the hydraulic jacks 166.

Hydraulic pump units 184 (FIG. 14) are connected to the hydraulic cylinders 184 via hydraulic pressure lines 186 and hydraulic return lines 188. The hydraulic pump 184 is configured to be controlled remotely via wire or wirelessly.

Electrical System

Figure 17:
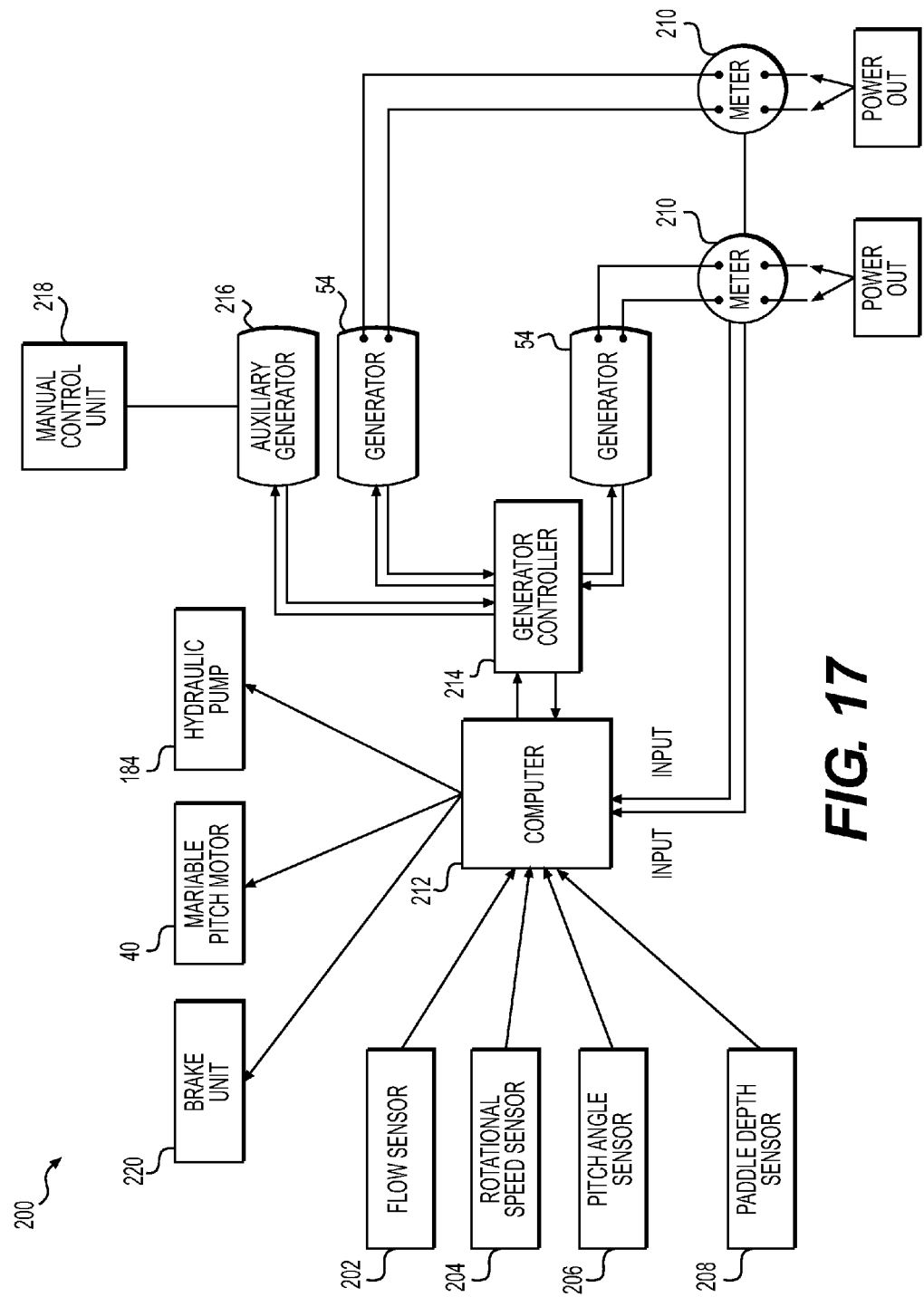
FIG. 17 is a diagrammatic view of the electrical system.

The electrical system 200 of the of the floating electrical power generator 10 is shown in FIG. 17.

The electrical system 200 comprises a variety of sensors, including a flow sensor 202 for detecting the water speed of the water flow F relative to the floating power generator 10

(110); a rotational speed sensor 204 for detecting the rotational speed of the water wheel 220; a pitch angle sensor 206 for detecting the pitch angle of the paddles 28 (128); and a paddle depth sensor 208 for detecting the depth of the paddles 28 (128) relative to the water level WL. The electrical system 200 further comprises power meters 210 configured for detecting the power output of the electrical generators 54 in real time.

The electrical system 200 comprises a computer 212 for receiving input signals from the flow sensor 202, rotational speed sensor 204, pitch angle sensor 206, paddle depth sensor 208, and power meters 210, and generating output signals for controlling the operation of the floating power generator 10. Specifically, the computer 212 generates output signals for controlling the operation of the generator controller 214 (e.g. variable speed controller). The generator controller 214 is configured to control the operation of the electrical generators 54, for example, configured to control the rotational speed, and voltage applied and current through the windings of the rotor and stator of each generator 54.

The computer 212 generates output signals for controlling the motor 48 for adjusting or changing the pitch of the paddles 28. Further, the computer 212 generates output signals for controlling the hydraulic pump unit 185 for raising or lowering the paddle wheel 20 for adjusting or changing the depth of the paddles 28 relative to the water level WL Optionally, the electrical system 200 can comprise an auxiliary electrical power generator 214 (e.g. fuel, gasoline, gas, propane, battery powered electrical power generator) configured to operate one or both of the electrical generators 54 for driving the water wheel 20, for example, when propelling or maneuvering the floating power generator 10. Further, the electrical system 200 can include an optional manual or remote control unit 216 configured to operate and control the operation of the water wheel 20 when propelling or maneuvering the floating power generator 10. In this manner, the floating power generator 20 can be self-propelled to transport and maneuvered to a particular position and orientation on the flowing body of water without the need of being towed and/or manipulated by another boat (e.g. tow boat).

In addition, the electrical system 200 can include a remotely operated brake device 218 to brake the paddle wheel 20, or lock the paddle wheel 20 from rotating. For example, the brake device 218 is configured to quickly brake the paddle wheel 20 in the event of an emergency, or can be used to lock the paddle wheel 20 from rotating when not operating or when being transported on the flow body of water. Also, the braking device 218 can be used in combination with the computer 212 to limit the maximum speed of rotation of the water wheel 20 via a computer program.

The brake device 118, for example, can be a disc brake unit having a caliper applied to the worm gear 44 (FIG. 12) being used as a disc brake rotor.

Alternative Floating Power Generator

Figure 19:
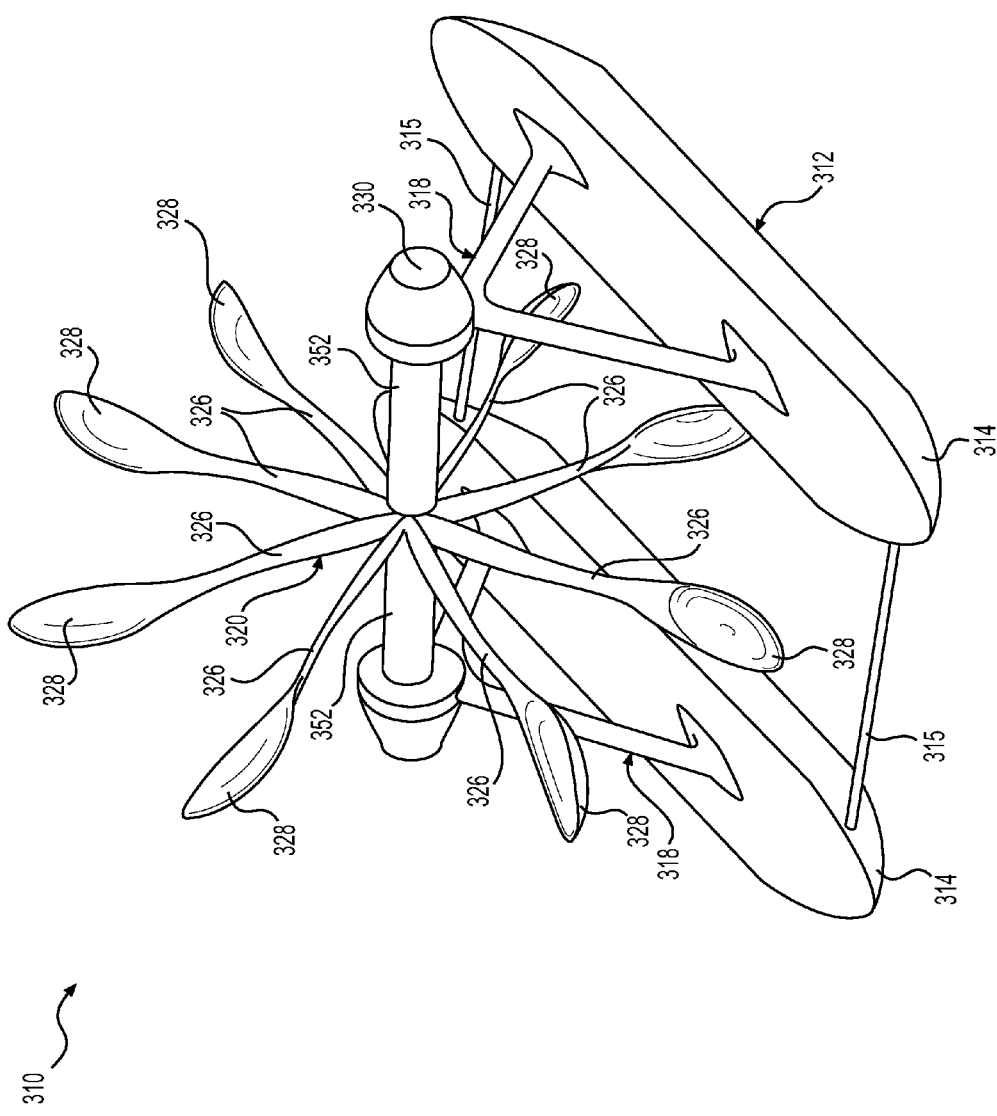
FIG. 19 is a perspective view of another floating power generator.

A floating power generator 310 is shown in FIG. 19. The floating power generator 310 comprises a catamaran 312 having two (2) hulls 314 connected together by cross members 315.

A set of frames 316 are mounted on respective hulls 314 supporting a water wheel 320. The water wheel 320 comprises eight (8) spoon-shaped paddles 326 having spoon portions 328. The spoon portions 328 are angled transversely as shown. The spoon portions 328 can be set at a slight angle (e.g. + or −10 degrees) from transverse.

The paddles 326 can be made of metal (e.g. fabricated, welded, forged), or can be made of plastic (e.g. molded fiberglass, carbon graphite, Kevlar).

The water wheel 320 is mounted on an axle 352 supported by the frames 318. A hub cover 330 is provided on one or both sides of the axle 352. One or more electrical generators can be connected to either or both sides of the axle 352, and located under the hub cover 330.

Figure 18:
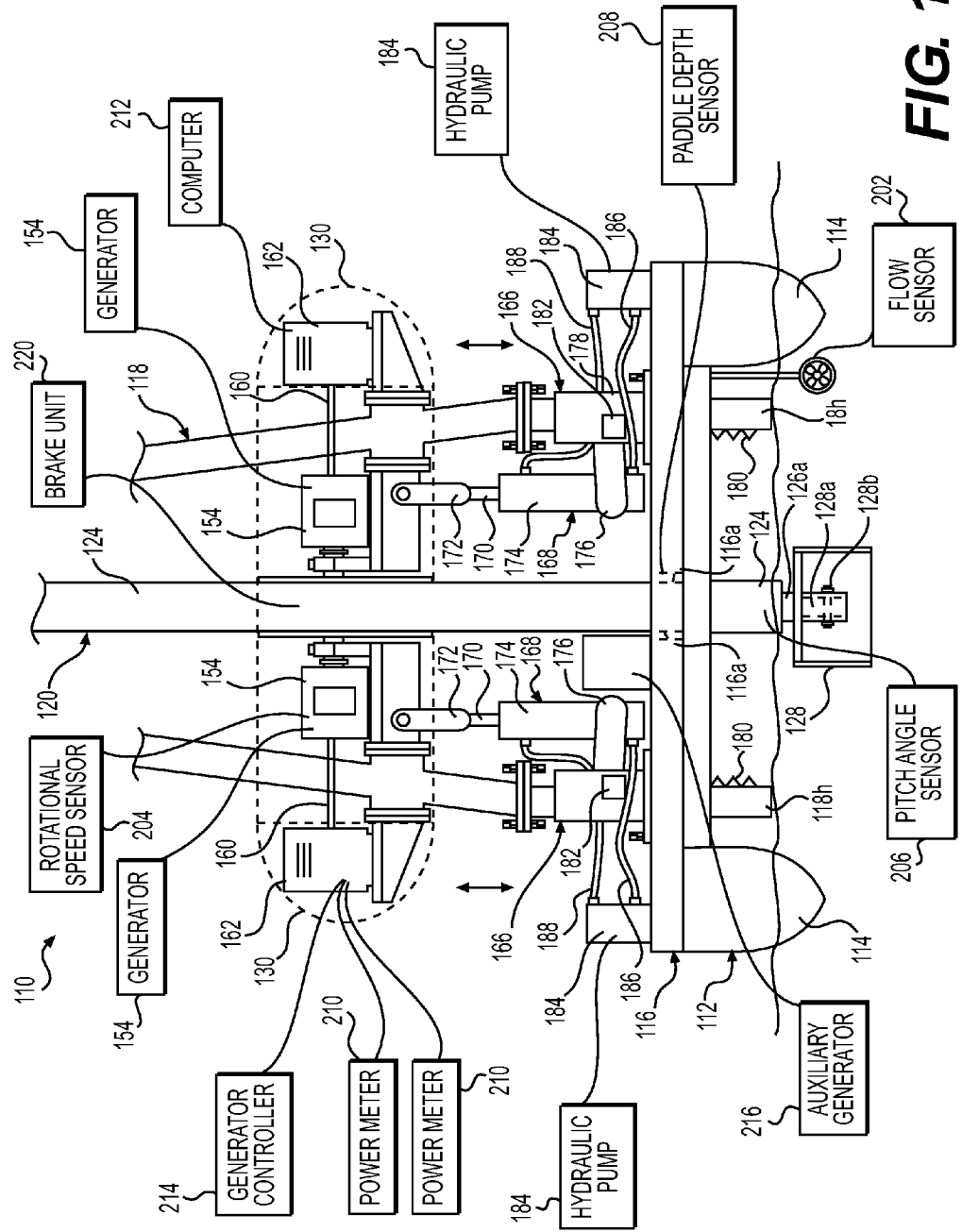
FIG. 18 is a partial end elevational view of the floating power generator shown in FIG. 14 along with components of the electrical system shown in FIG. 17.

The floating power generator 310 can include all the features, components, and/or arrangement like the floating power generator 110, as shown in FIGS. 17 and 18.

Operation

The floating electrical power generator 10 is positioned in the flowing body of water, and then anchored to become operational. The brake device 118 is operated to release the brake and allow the paddle wheel 20 to rotate via the flowing water body operating on the paddles 28.

The electrical generators 54 can optionally include a switch to turn on or off the electrical circuits of the rotor and stator of the electrical generators 54. For example, the electrical generators 54 can be switched in a first mode to freely rotate without generating power. In this manner, the water wheel 20 can drive the electrical generator without generating power. Then, the electrical generators 54 can be switched to a second mode to generate electrical power. In addition, the electrical circuits in the rotor and stator of the electrical generators 54 can be configured to be controlled by the electrical controller 112 to control the operation thereof. Additional electrical equipment can be provided to provide this type of control of the electrical generators 54 by the electrical controller 112. For example, an electrical type of variable speed drive 65 (FIG. 15) can be installed to provide computer controlled operation of the electrical generators 54 to maximize electrical power output from the electrical generators 54.

Alternatively, a mechanical type of variable speed drive 65 can be installed and configured to provide computer controlled operation of the mechanical load (e.g. power) applied from the water wheel 20 to the electrical generators 54 to maximize electrical power output from the electrical generators 54.

The electrical controller 112 can also computer control the operation of the motor 50 to adjust or change the pitch of the paddles 28 along with the operation of the motor 48 in real time operation, for example, to maximize the electrical power output of the electrical generators.

The electrical controller 112 can be a computer programmed electrical controller programmed, for example, to control the operation of the floating electrical power generator 10 in real time, and maximize the electrical output of the electrical generators 54. For example, the input from the power output meter 110 is sampled and recorded along with the inputs from the pitch angle detector 106 and paddle depth sensor 108. The computer programmed electrical control is provided with a computer program or algorithm to continuously adjust and test the power output to continuously update and maximize power output of the electrical generators 54 while operating to generate power.

I claim:

1. A floating power generator, comprising:
   a boat or vessel having at least one hull;
   a frame connected to the boat or vessel and extending upwardly from the boat or vessel;

a paddle wheel supported by the frame at an elevated position of rotation above the at least one hull of the boat or vessel;
an electrical system for generating electrical power and providing a power source, the electrical system located on the boat or vessel, the electrical system comprising:
an electrical generator connected to and driven by the paddle wheel, the electrical generator being located on a side of the paddle wheel and support by the frame at the elevated position above the at least one hull of the boat or vessel;
a generator controller connected to the electrical generator to control the operation of the electrical generator;
a rotational speed sensor configured for detecting the rotational speed of the paddle wheel;
a water flow speed sensor configured for detecting a water flow speed relative to the floating power generator;
a power meter connected to the electrical generator, the power meter serving as a power output for the electrical system; and
a computer for receiving inputs from the rotational speed sensor, the water flow speed sensor, and the power meter, and generating an output signal controlling the generator controller.

2. A floating electrical power generator, comprising:
a boat or vessel having at least one hull;
a frame connected to the boat or vessel and extending upwardly from the boat or vessel;
a paddle wheel supported by the frame at an elevated position of rotation above the at least one hull of the boat or vessel;
a pair of mounts supported by the frame at the elevated position of rotation above the at least one hull of the boat or vessel, the pair of mounts rotatably supporting an axle of the paddle wheel on the frame;
a mechanical variable speed drive connected to and driven by the paddle wheel; and
an electrical system for generating electrical power and providing a power source, the electrical system located on the boat or vessel, the electrical system comprising:
an electrical generator connected to the mechanical variable speed drive, the electrical generator being located on a side of the paddle wheel and supported by the frame at the elevated position above the at least one hull of the boat or vessel;
a generator controller connected to the electrical generator to control the operation of the electrical generator;
a rotational speed sensor configured for detecting the rotational speed of the paddle wheel;
a water flow speed sensor configured for detecting the water flow speed relative to the floating power generator;
a power meter connected to the electrical generator, the power meter serving as a power output for the electrical system; and
a computer for receiving one or more inputs from the rotational speed sensor, water flow speed sensor, and the power meter, and generating an output signal controlling the generator controller.

3. A floating electrical power generator, comprising:
a boat or vessel having at least one hull;
a frame connected to the boat or vessel and extending upwardly from the boat or vessel;
a paddle wheel supported by the frame at an elevated position of rotation above the at least one hull of the boat or vessel, the paddle wheel having an axle and a hub; and
an electrical generator directly connected to and driven by an axle of the paddle wheel, the electrical generator being located on a side of the hub of the paddle wheel and supported by the frame at the elevated position above the at least one hull of the boat or vessel; and
a generator controller connected to the electrical generator to control the operation of the electrical generator.

4. A floating power generation method, comprising:
providing a floating boat or vessel supporting a paddle wheel directly connected to an electrical generator, the floating boat or vessel having at least one hull, the electrical generator being located on a side of the paddle wheel;
elevating a rotational axis of the paddle wheel and generator at an elevated position of rotation above the hull of the floating boat or vessel by supporting the paddle wheel and generator on a frame extending above the at least one hull of the boat or vessel;
driving the paddle wheel by water flow;
driving the electrical generator using the paddle wheel;
within an onboard electrical system, variably controlling the operation of the electrical generator using a generator controller to optimize the generation of power from the generator based on the water flow speed relative to the floating power generator, and
outputting electrical power from the generator via a power meter to supply electrical power to a location off the floating boat or vessel.

5. The power generator according to claim 1, wherein the computer controls the generator controller and electrical generator in real time for maximizing the power output of the power generator.

6. The power generator according to claim 1 wherein the paddle wheel is directly connected to the electrical generator.

7. The power generator according to claim 6, wherein a paddle wheel shaft of the paddle wheel is directly coupled to an electrical generator shaft of the electrical generator.

8. The power generator according to claim 7, wherein a single shaft serves as a shaft for both the paddle wheel and the electrical generator.

9. The power generator according to claim 1, wherein the generator controller an electrical variable speed controller.

10. The power generator according to claim 1, wherein the electrical generator is a DC electrical generator.

11. The power generator according to claim 1, wherein the electrical generator is an AC electrical generator or alternator.

12. The power generator according to claim 1, wherein paddles of the water wheel have a variable configuration.

13. The power generator according to claim 12, wherein the paddles are configured to change pitch.

14. The power generator according to claim 1, wherein the paddle wheel comprises a hub.

15. The power generator according to claim 14, wherein the electrical generator is disposed within the hub.

16. The power generator according to claim 1, wherein the paddle wheel comprises a rotating hub portion and a fixed hub portion, the fixed hub portion containing the electrical generator.

17. The power generator according to claim 1, wherein the computer comprises a microprocessor.

18. The power generator according to claim 1, wherein the computer comprises a microcontroller.

19. The power generator according to claim 1, further comprising a mechanical variable speed drive connecting the axle of the water wheel to the electrical generator.

20. The power generator according to claim 2, wherein the generator controller is an electrical variable speed drive connected to the electrical generator to control the operation of the electrical generator.

21. The power generator according to claim 3, further comprising a mechanical variable speed drive connecting an axle of the water wheel to the electrical generator.

22. The power generator according to claim 1, wherein the boat or vessel comprises a pair of hulls having a platform connecting the hulls together; and a frame connected to the platform, the paddle wheel having an axle supported above the platform by the frame.

23. The power generator according to claim 2, wherein the boat or vessel comprises a pair of hulls having a platform connecting the hulls together; and a frame connected to the platform, the paddle wheel having an axle supported above the platform by the frame.

24. The power generator according to claim 3, wherein the boat or vessel comprises a pair of hulls having a platform connecting the hulls together; and a frame connected to the platform, the paddle wheel having an axle supported above the platform by the frame.

25. The power generator according to claim 22, wherein the generator is directly connected to the axle of the paddle wheel and support above the platform by the frame.

26. The power generator according to claim 23, wherein the generator is directly connected to the axle of the paddle wheel and support above the platform by the frame.

27. The power generator according to claim 24, wherein the generator is directly connected to the axle of the paddle wheel and support above the platform by the frame.

* * * * *